H. A. DAVIS.
ROCKER SHAFT BEARING FOR LOOMS.
APPLICATION FILED JAN. 5, 1918.
1,278,443.
Patented Sept. 10, 1918.
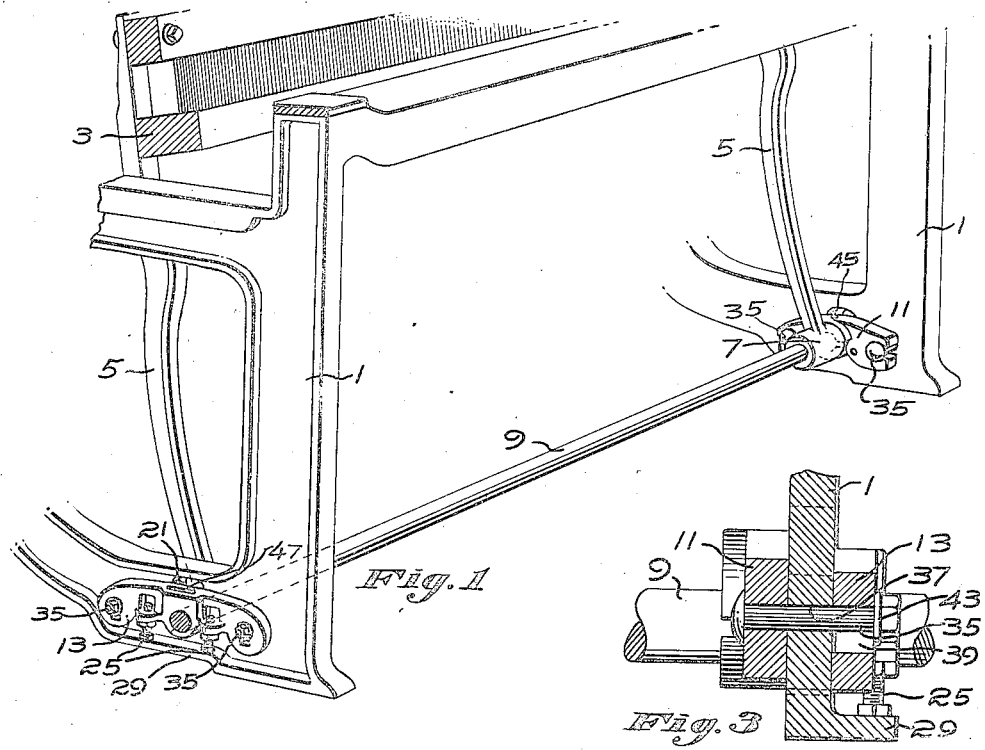
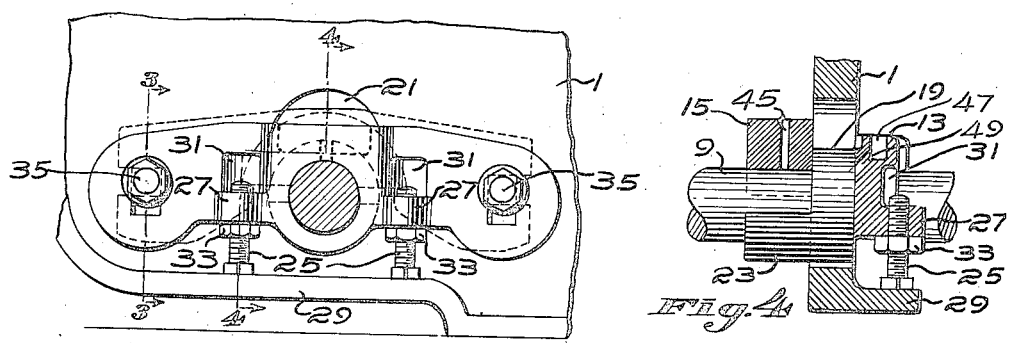

UNITED STATES PATENT OFFICE.

HARRY A. DAVIS, OF HOPEDALE, MASSACHUSETTS, ASSIGNOR TO DRAPER CORPORATION, OF HOPEDALE, MASSACHUSETTS, A CORPORATION OF MAINE.

ROCKER-SHAFT BEARING FOR LOOMS.

1,278,443.

Specification of Letters Patent.

Patented Sept. 10, 1918.

Application filed January 5, 1918. Serial No. 210,432.

*To all whom it may concern:*

Be it known that I, HARRY A. DAVIS, a citizen of the United States, residing at Hopedale, county of Worcester, and State of Massachusetts, have invented an Improvement in Rocker-Shaft Bearings for Looms, of which the following description, in connection with the accompanying drawings, is a specification, like characters on the drawings representing like parts.

The invention hereinafter described relates to bearings for the rocker-shaft of the lay for looms.

The constant rocking of the shaft as the lay oscillates produces wear on the shaft or its bearings which in time admits objectionable play or lost motion of the shaft in its bearings, resulting in imperfect weaving. Heretofore various bearings have been designed for the purpose of compensating for this wear, but there are certain objections thereto.

One form of bearing is located on the floor intermediate the sides of the loom frame, but this form among other objections requires base plates which are separate from the loom frame and must be attached to the floor supporting said frame and be subject to the irregularities and vibration of the floor. Another form of bearing has been mounted directly on the loom frame, but the construction is such that the rocker-shaft itself must be moved endwise into the bearing. This necessitates dismantling of the lay, especially if it is desired to apply the bearing to a loom already in use, since the swords of the lay must be released from the rocker-shaft before the latter can be moved lengthwise and inserted through the bearings. Then after the bearings have been applied, it is necessary to carefully adjust and reassemble and secure the parts of the lay together.

The present invention, among other objects, provides a simple, cheap and efficient bearing which may be readily applied to the rocker-shaft without dismantling the lay, without disconnecting the swords from the rocker-shaft, and without axial adjustment of the rocker-shaft.

Another object of the invention is to provide a simple and effective bearing which may be readily adjusted from time to time as required to compensate for wear on the bearing or rocker-shaft.

With the above and other objects in view, the character of the invention may be best understood from the following description of one good form of means for carrying the invention into practical effect.

In the drawings:

Figure 1 is a perspective view of the front portion of the loom showing the rock shaft bearings in place;

Fig. 2 is an enlarged side elevation in detail looking at the bearing from the outside of the loom frame;

Fig. 3 is a section taken on line 3—3 of Fig. 2;

Fig. 4 is a section taken on line 4—4 of Fig. 2; and

Fig. 5 is a perspective view of parts of the bearing unassembled.

Referring to the drawings, 1 (Fig. 1) designates the front portion of a loom frame carrying the usual lay 3 having swords 5 with hubs 7 secured to the rocker-shaft 9 journaled in bearings mounted on the frame and projecting beyond said bearings to support the usual picker sticks. As stated, the present invention contemplates the provision of bearings for the rocker-shaft which may be readily applied to said shaft without disturbing the relation of said shaft to the lay. Since the bearings to be described are similar, a description of one will suffice for both. In the present instance of the invention, this bearing comprises an inside member 11 and an outside member 13. The inside member is provided with an open bearing section or portion 15, in the circular arc surface of which the upper side of the lay rocker-shaft is adapted to bear. The construction is such that the inside member may be laterally presented to the rocker-shaft transversely to the direction of the axis of said shaft without disturbing the latter. Preferably, the inside member is applied to the shaft at a point between the inner face of the frame and the outer end of the sword hub. The bearing portion 15 may desirably project somewhat from the body of the inside member and engage said hub and limit axial movement of the rocker-shaft. The inside member may have openings 17 in the ends thereof through which bolts may project to secure said member on the inside of the loom frame, as more fully hereinafter described.

The outside member 13 may have a cylindrical bearing portion 19 adapted to project laterally from the body of the outside member inward through an opening 21 in the frame which may be elongated to admit adjustment of said outside member, as more fully hereinafter described. An open bearing section or portion 23 may project inwardly from the cylindrical bearing portion and bear against the under side of the rock-shaft. In the present form of the invention, the bearing portion 23 is opposed to the bearing portion 15, and each of said portions is somewhat less than 180° in extent, so that they will not embrace the complete circumference of the shaft, and therefore, will allow one of said portions to be adjusted relatively to the other to compensate for wear between the shaft and said bearing portions.

Suitable means may be provided to adjust one of the members relatively to the other to compensate for the wear as described. In the present instance of the invention, to accomplish this, a pair of screws 25 may be provided threaded into lugs 27 projecting laterally from the outer face of the outside member. The heads of said screws may rest upon the upper surface of the bottom flange 29 of the loom frame, and the upper ends of the screws may project into recesses 31 in the body of the outside member directly above said lugs. The screws may be provided with suitable lock nuts 33 to hold them in their positions of adjustment.

The outside member may be inserted over the end of the rocker-shaft after the picker stick is removed, said member being then slid along said shaft until it engages the outer face of the web of the loom frame. To secure the members to the frame, in the present instance of the invention, a pair of bolts 35 may be provided, adapted to project through the openings 17 in the inside member, thence through openings 37 (Fig. 3) in the web of the frame, and thence through elongated openings 39 in the body of the outside member. The ends of the body of the outside member may be formed to present bosses 41 surrounding the openings 39 and adapted to engage the outer face of the web of the frame. The securing bolts may have suitable washers 43 interposed between the nuts of the bolts and the outer face of the outside member. When the bolts are tightened, they will draw the members tightly against the opposite faces of the web of the frame and securely hold the members in position.

The inside member may have a port 45 to admit oil to the engaging surfaces of the bearing portion 15 and the rocker-shaft, and the outside member may have a recess 47 and a port 49 to admit oil to the engaging surfaces of the bearing portions 19 and 23, and the shaft.

The bearing described lends itself admirably to the application of lay rocker-shafts already mounted in the loom frame, and thus the bearing may be readily applied, not only to new looms, but to those already in use. To apply the bearing to the shaft, it is merely necessary to present the inside bearing member laterally to the shaft at the inner face of the frame, slide the outside member over the end of the shaft to the outer face of the frame, and secure the bolts in place. When the surfaces of the bearing members and the shaft become worn from use, the outer member may be readily adjusted to lift its bearing portion 23 and draw the shaft upward so that the upper side thereof will properly engage the bearing portion 15 of the inside member. To accomplish this, the nuts of the bolts are released somewhat, the screws 25 are adjusted to elevate the outside member the extent required, and the nuts of the adjusting screws and securing bolts are then tightened. It will be noted that the nuts of said screws and said securing bolts are located at the outside of the frame, where they are conveniently accessible for adjustment.

It will be understood that the invention is not limited to the specific embodiment shown, but that various deviations may be made therefrom without departing from the spirit and scope of the appended claims.

What is claimed is:—

1. In a loom, the combination with the loom frame and lay rocker-shaft, of a bearing for the latter comprising opposed members for application to outer and inner faces of a part of said frame and having bearing portions for receiving said shaft, the bearing portion of said inner member being open to admit the same to said shaft in a direction transversely to the axis of said shaft.

2. A bearing for the lay rocker-shaft of a loom comprising opposed members having bearing portions for receiving the rocker-shaft, one of said bearing portions being open to allow presentation thereof to said shaft transversely to the axis of said shaft, means for securing said members to the loom frame, and means relatively to adjust said members to compensate for wear on the parts.

3. A bearing for the lay rocker-shaft of a loom comprising members for application to opposite faces of a part of the loom frame and having bearing portions for receiving the rocker-shaft, one of said bearing portions being open to allow presentation thereof to said shaft transversely to the axis thereof, and means to secure said members to said frame.

4. A bearing for the lay rocker-shaft of a loom comprising members having opposed, spaced bearing portions for receiving the rocker-shaft between them, and means to adjust one of said portions toward the other to compensate for wear on the parts.

5. A bearing for the lay rocker-shaft of a loom comprising members having opposed, spaced arcuate portions for receiving the rocker-shaft between them, means to adjust one of said portions toward the other to compensate for wear on the parts, and means for securing said members to the frame of the loom.

6. A bearing for the lay rocker-shaft of a loom comprising members for application to opposite faces of the loom frame, said members having open bearing elements, and one of said members having a part adapted to project through the frame and support its bearing element in opposed relation to the bearing element of the other member.

7. In a loom, the combination with a frame having a flange, of a lay rocker-shaft, and a bearing for the latter comprising members mounted on opposite faces of said frame and having open bearing parts receiving said shaft, screw means coöperating with said frame flange and one of said members to adjust the same relatively to the other member to compensate for wear between the shaft and members, and means to secure said members to said frame.

8. In a loom, the combination with the loom frame and lay rocker-shaft, of a bearing for the latter comprising bearing members, one formed for insertion over an end of said shaft and the other formed for lateral presentation to said shaft, and means to secure said members to said frame.

9. In a loom, the combination with the loom frame and lay rocker-shaft, of a bearing for the latter comprising opposed members, one thereof being formed for lateral presentation to said shaft, means to secure said member to said frame, and means to adjust the other member relatively thereto to compensate for wear between said shaft and members.

10. In a loom, the combination with the loom frame and lay rocker-shaft, of a bearing for the latter comprising members having opposed bearing sections receiving said shaft between them, one of said members having a cylindrical portion projecting from its body through the frame to its bearing section, and means to secure said members to said frame.

11. In a loom, the combination with the loom frame and lay rocker-shaft, of a bearing for the latter comprising members for application to opposite faces of a part of the frame and having bearing portions, one of which is open to allow lateral application thereof to said shaft, means to adjust one of said members relatively to the other to compensate for wear between the shaft and said bearing portions, said adjustable member having elongated openings therein, and bolts projecting through the other member, said frame and said elongated openings to secure said members to said frame.

In testimony whereof, I have signed my name to this specification.

HARRY A. DAVIS.